(12) United States Patent
Soejima et al.

(10) Patent No.: US 12,102,914 B2
(45) Date of Patent: Oct. 1, 2024

(54) NON-TRANSITORY COMPUTER READABLE MEDIUM, INFORMATION PROCESSING METHOD, AND INFORMATION PROCESSING DEVICE

(71) Applicant: CYGAMES, INC., Tokyo (JP)

(72) Inventors: Yasutaka Soejima, Tokyo (JP); Kazuto Saito, Tokyo (JP)

(73) Assignee: CYGAMES, INC., Tokyo (JP)

( * ) Notice: Subject to any disclaimer, the term of this patent is extended or adjusted under 35 U.S.C. 154(b) by 178 days.

(21) Appl. No.: 17/456,475

(22) Filed: Nov. 24, 2021

(65) Prior Publication Data

US 2022/0096927 A1 Mar. 31, 2022

Related U.S. Application Data

(63) Continuation of application No. PCT/JP2020/018716, filed on May 8, 2020.

(30) Foreign Application Priority Data

May 24, 2019 (JP) ................. 2019-097895

(51) Int. Cl.
*A63F 13/52* (2014.01)
*A63F 13/525* (2014.01)
*A63F 13/56* (2014.01)
*A63F 13/58* (2014.01)

(52) U.S. Cl.
CPC ............ *A63F 13/525* (2014.09); *A63F 13/56* (2014.09); *A63F 13/58* (2014.09); *A63F 2300/6661* (2013.01)

(58) Field of Classification Search
CPC .......... A63F 13/22; A63F 13/25; A63F 13/40; A63F 13/42; A63F 13/426; A63F 13/45; A63F 13/50; A63F 13/525; A63F 13/5258; A63F 13/55; A63F 13/58; A63F 13/56

See application file for complete search history.

(56) References Cited

U.S. PATENT DOCUMENTS

| | | | |
|---|---|---|---|
| 6,606,104 B1 | 8/2003 | Kondo et al. | |
| 2010/0069152 A1* | 3/2010 | Nishimura | ............ A63F 13/525 |
| | | | 463/31 |
| 2018/0193743 A1* | 7/2018 | Kitazono | ................ A63F 13/42 |

FOREIGN PATENT DOCUMENTS

| | | |
|---|---|---|
| JP | 2000317139 A | 11/2000 |
| JP | 2012141820 A | 7/2012 |
| JP | 5359054 B2 | 12/2013 |

OTHER PUBLICATIONS

Sneak Ups, Youtube, 2018, https://www.youtube.com/watch?v=uekLiXCZRvs&t=118s (Year: 2018).*

(Continued)

*Primary Examiner* — Omkar A Deodhar
(74) *Attorney, Agent, or Firm* — Osha Bergman Watanabe & Burton LLP

(57) ABSTRACT

A non-transitory computer readable medium stores a program causing a computer to execute: moving an own object in a virtual space in response to a player operation; controlling movement of an other object in the virtual space; and executing, when the own object enters a correction range set for the other object, correction processing with respect to an image acquired and generated by a virtual camera disposed in the virtual space.

9 Claims, 19 Drawing Sheets

(56) References Cited

OTHER PUBLICATIONS

Let's play Sneak Ops! Roundup of tips and techniques for acting not to be found by enemy [online], Aug. 13, 2018 [Retrieved on Mar. 30, 2021] Internet <URL: https://applibito.com (9 pages).
International Search Report issued in International Application No. PCT/JP2020/018716, mailed Jul. 21, 2020 (4 pages).
Written Opinion issued in International Application No. PCT/JP2020/018716; Dated Jul. 21, 2020 (4 pages).
Office Action issued in Japanese Application No. 2019-097895; Dated Apr. 20, 2021 (6 pages).
Office Action issued in Japanese Application No. 2019-097895; Dated Jul. 14, 2020 (8 pages).

\* cited by examiner

NON-TRANSITORY COMPUTER READABLE MEDIUM, INFORMATION PROCESSING METHOD, AND INFORMATION PROCESSING DEVICE

CROSS REFERENCE TO RELATED APPLICATIONS

This application is a continuation application of International Application No. PCT/JP2020/018716, filed on May 8, 2020, which claims priority to Japanese Patent Application No. 2019-097895, filed on May 24, 2019, the entire contents of which are incorporated by reference herein.

BACKGROUND ART

Technical Field

The present invention relates to an information processing program, an information processing method, and an information processing device.

Among conventional information processing devices (game devices), there is a proposed information processing device (game device) in which, when an object that is moved in a virtual space in response to a player operation passes through a correction-value switching point set in advance, color correction data at the correction-value switching point is obtained, and hue data in an image is corrected on the basis of the correction value of the obtained color correction data corresponding to the correction-value switching point (for example, Patent Literature 1).

CITATION LIST

Patent Literature

Patent Literature 1: JP 5359054 B

SUMMARY OF INVENTION

Technical Problem

Incidentally, there is an information processing device for executing, for example, a so-called battle game in which an own object that can be operated by a player and an other object the movement of which is controlled by a computer battle each other. In such a battle game, while the positional relationship between the own object and the other object is an important factor, there are cases in which it is difficult for the player to notice whether the own object approaches the other object.

An object of the present invention is to provide an information processing program, an information processing method, and an information processing device with which it is possible to allow a player to notice the approaching of an own object and an other object.

Solution to Problem

In order to solve the above-described problem, the present invention provides an information processing program for causing a computer to function as: an own-object control unit that moves an own object in a virtual space in response to a player operation; an other-object control unit that controls movement of an other object in the virtual space; and a correction processing unit that executes, when the own object enters a correction range set for the other object, correction processing with respect to an image acquired and generated by a virtual camera disposed in the virtual space.

Furthermore, the correction range and priority may be set for each of a plurality of other objects; and the correction processing unit may execute the correction processing with respect to the image on the basis of the priority when the own object enters an area where the correction ranges set for the plurality of other objects overlap.

Furthermore, a blend correction range may be set, for the other object, at an outer side of the correction range; and the correction processing unit may execute, when the own object enters the blend correction range, the correction processing with respect to the image in accordance with the distance between the correction range and the own object.

In order to solve the above-described problem, the present invention provides an information processing method including: moving an own object in a virtual space in response to a player operation; controlling movement of an other object in the virtual space; and executing, when the own object enters a correction range set for the other object, correction processing with respect to an image acquired and generated by a virtual camera disposed in the virtual space.

In order to solve the above-described problem, the present invention provides an information processing device including: an own-object control unit that moves an own object in a virtual space in response to a player operation; an other-object control unit that controls movement of an other object in the virtual space; and a correction processing unit that executes, when the own object enters a correction range set for the other object, correction processing with respect to an image acquired and generated by a virtual camera disposed in the virtual space.

Effects of Disclosure

According to the present invention, it is possible to allow a player to notice the approaching of an own object and an other object.

DESCRIPTION OF EMBODIMENTS

One aspect of an embodiment of the present invention will be described in detail below with reference to the accompanying drawings. The dimensions, materials, other specific values, etc. given in this embodiment are merely examples for facilitating understanding, and do not limit the present invention unless otherwise specifically mentioned. Note that, in this specification and the drawings, duplication of description will be omitted by assigning identical reference signs to elements that have substantially the same functions and configurations, and elements that are not directly related to the present invention are not shown.

(Overall Configuration of Information Processing System IS)

Figure 1:
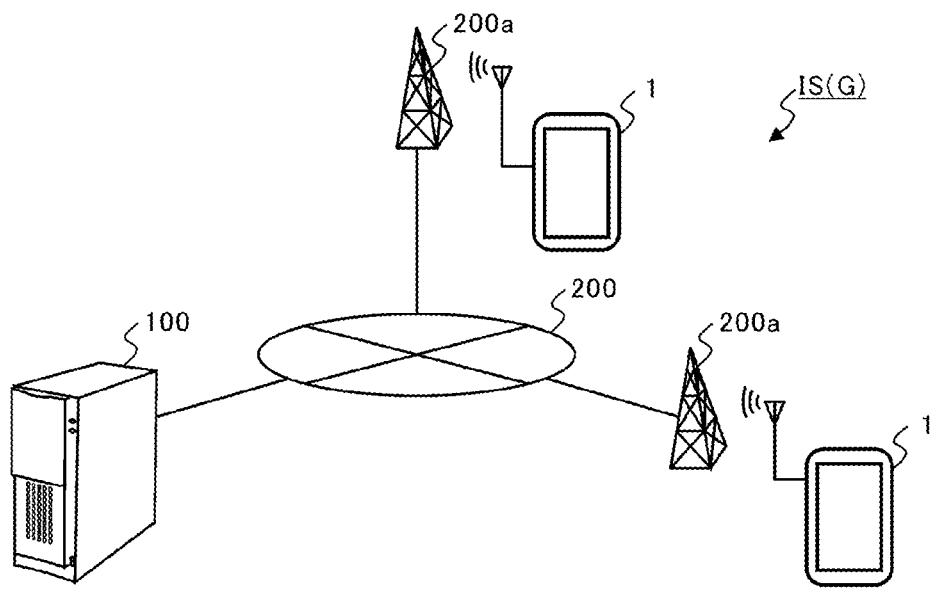
FIG. 1 is an explanatory view showing, in outline, the configuration of an information processing system.

FIG. 1 is an explanatory view showing, in outline, the configuration of an information processing system IS. The information processing system IS is a so-called client/server system that includes player terminals 1, a server 100, and a communication network 200 having communication base stations 200a.

Each of the player terminals 1 can establish communication with the server 100 via the communication network 200. The player terminals 1 widely include electronic appliances that can be communicatively connected to the server 100 by wire or wirelessly. Examples of the player terminals 1 include mobile phones such as smartphones, tablet devices, personal computers, game machines, or the like. In this embodiment, a description will be given of a case in which smartphones are used as the player terminals 1.

The server 100 is communicatively connected to a plurality of player terminals 1. The server 100 accumulates various kinds of information for each player who plays a game. Furthermore, the server 100 updates the accumulated information and controls the proceeding of the game on the basis of operations input from the player terminals 1.

The communication base stations 200a are connected to the communication network 200 and send information to and receive information from the player terminals 1 wirelessly. The communication network 200 is configured of a mobile-phone network, the Internet, a local area network (LAN), a dedicated line, or the like, to realize wireless or wired communication connection between the player terminals 1 and the server 100.

In the information processing system IS according to this embodiment, a player terminal 1 and the server 100 function as information processing devices G. The player terminal 1 and the server 100 respectively play roles for controlling the proceeding of a game, whereby it is possible to proceed with the game through cooperation between the player terminal 1 and the server 100.

(Hardware Configuration of Player Terminal 1 and Server 100)

Figure 2A:
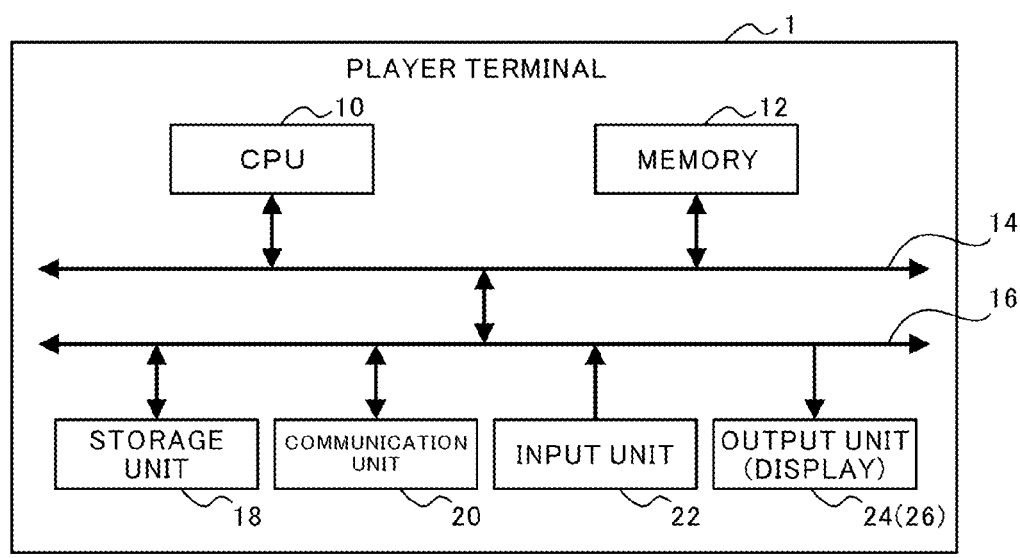
FIG. 2A is a diagram for explaining the hardware configuration of a player terminal.
Figure 2B:
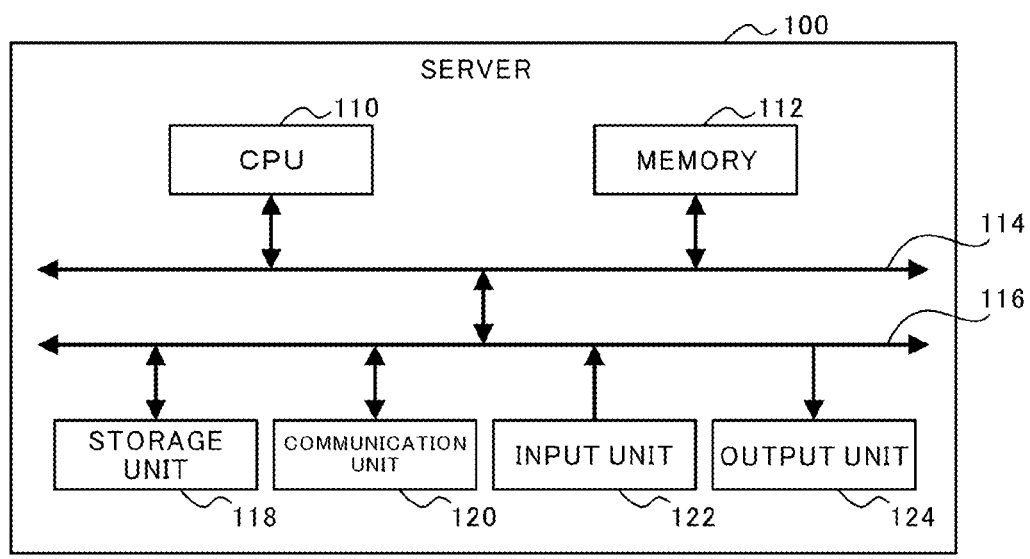
FIG. 2B is a diagram for explaining the hardware configuration of a server.

FIG. 2A is a diagram for explaining the hardware configuration of the player terminal 1. Furthermore, FIG. 2B is a diagram for explaining the hardware configuration of the server 100. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and the functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24 of the player terminal 1, respectively. Therefore, the hardware configuration of the player terminal 1 will be described below, and a description of the server 100 will be omitted.

The CPU 10 runs a program stored in the memory 12 to control the proceeding of the game. The memory 12 is configured of a read only memory (ROM) or a random access memory (RAM) and stores programs and various kinds of data needed for controlling the proceeding of the game. The memory 12 is connected to the CPU 10 via the bus 14. Although it is assumed that the memory 12 is configured of a RAM in this embodiment, the memory 12 may also be configured of a ROM or may also be configured to include both a RAM and a ROM.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, the programs and data stored in the storage unit 18 are loaded into the memory 12 (RAM) by the CPU 10.

The communication unit 20 is communicatively connected to the communication base station 200a wirelessly, and sends information to and receives information from the server 100 via the communication network 200, such as various kinds of data and programs. At the player terminal 1, the programs etc. received from the server 100 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Yet alternatively, the input unit 22 may be configured of an acceleration sensor that detects tilting or movement of the player terminal 1 or a microphone that detects speech of the player. That is, the input unit 22 may widely include devices that enable the player to input his or her intents in distinguishable manners.

The output unit 24 is configured to include a display device and a speaker. Note that the output unit 24 may be a device connected (externally attached) to the player terminal 1. In this embodiment, the player terminal 1 includes a display 26 as the output unit 24, and includes, as the input unit 22, a touchscreen provided in the display 26 so as to be overlaid thereon.

(Game Content)

Next, an example of the content of the game provided by the information processing system IS (information processing device G) of this embodiment will be described. In this embodiment, a so-called action roll playing game (RPG) is provided. Specifically, in the game of this embodiment, a plurality of ally characters are provided. The player selects some (here, four) ally characters from among the provided ally characters to organize a party. Furthermore, the player sets one of the ally characters organized into the party to an operation-target character (own object, hereinafter, referred to as "player character PC") that can be operated by the player himself or herself.

Figure 3A:
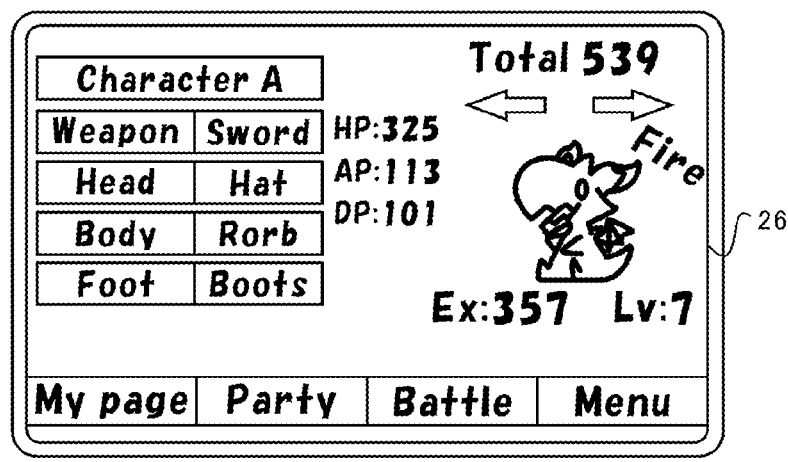
FIG. 3A shows an example of a party organizing screen for organizing a party.

FIG. 3A shows an example of a party organizing screen for organizing a party. For each ally character, experience points Ex and a level Lv are stored in association therewith. The experience points Ex are raised when a battle game, to be described later, has been won or when a predetermined item has been used. The level Lv is set in accordance with the experience points Ex, and the level Lv is raised each time the experience points Ex reach a predetermined value. Note that an upper limit value of the level Lv is set for each ally character, and the level Lv is raised only within the range defined by the upper limit value.

Furthermore, base values of battle abilities, such as life points HP, an attacking power AP, and a defensing power DP, are set for each ally character in accordance with the level Lv. The player can proceed with the battle game more advantageously as the battle abilities of ally characters become higher. Furthermore, the base values set for ally characters are raised as the levels Lv thereof become higher.

Furthermore, in the party organizing screen, the player can equip the ally characters organized into the party with equipment such as weapons and protective gear (set such equipment for the ally characters). Additional values for the attacking power AP, the defensing power DP, etc., are set for each of the items of equipment. When the ally characters are equipped with such equipment, the additional values of the individual items of equipment are added to the base values mentioned above, which makes it possible to enhance the battle abilities of the ally characters.

Note that each ally character has an attribute set therefor in advance. In this embodiment, three kinds of attributes, i.e., "fire", "wind", and "water", are provided, and all the ally characters have one of the three attributes set therefor.

The player can utilize the party, which has been organized as described above, in the battle game. The object of a battle game is to win the game by beating enemy characters (other objects) with the ally characters organized into the party. In the battle game, the player operates the input unit 22 of the player terminal 1 so as to cause the player character PC to perform a movement action or an attack action.

Furthermore, the ally characters other than the player character PC are caused to perform movement actions or attack actions under computer control or by other players. When an attack action is performed, damage points are assigned to an enemy character, and the damage points are subtracted from the life points HP of the enemy character. The enemy character vanishes when the life points HP thereof become 0.

The enemy characters are made to perform movement actions and attack actions through computer control. When an attack action is performed, damage points are assigned to an ally character, and the damage points are subtracted from the life points HP of the ally character. Then, when the life points HP of all the ally characters become 0, the battle game will be lost.

Figure 3B:
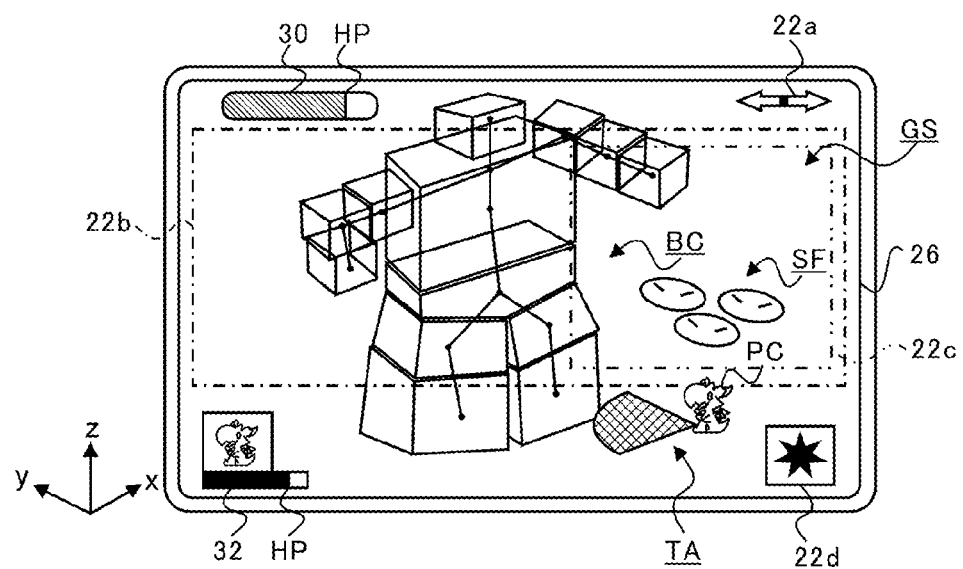
FIG. 3B is an illustration for explaining an example battle game.

FIG. 3B is an illustration for explaining an example of the battle game. Although a detailed description will be omitted, the player can select and play one of a plurality of battle games. When the player has selected a battle game, the party organizing screen shown in FIG. 3A is displayed. The battle game is started when the player finishes organizing a party on the party organizing screen and performs a predetermined battle start operation.

In the battle game, as shown in FIG. 3B, a virtual game space (virtual space) GS is displayed. In the game space GS, the ally characters, including the player character PC, and the enemy characters are provided. Note that, in FIG. 3B, only the player character PC is shown among the ally characters, and the ally characters other than the player character PC are omitted. Furthermore, a plurality of battle games are provided, including battle games in which only a boss character BC is provided as an enemy character and battle games in which mob characters SF are included in addition to the boss character BC.

As described in detail later, at the player terminal 1, image processing for generating the game space GS and characters (including ally characters and enemy characters) and displaying the game space GS and the characters on the display 26 is executed. For example, the player terminal 1 reads out various kinds of data and generates a three-dimensional game space GS. Then, the generated game space GS is captured by means of a virtual camera from a predetermined viewpoint, and a two-dimensional image thereof, as virtually viewed, is generated. This two-dimensional image is displayed on the display 26.

In the game space GS, three-axis position information based on the x-axis, the y-axis, and the z-axis shown in FIG. 3B is defined, and character actions are controlled on the basis of this position information. Furthermore, a boss-character life meter 30 and a player-character life meter 32 are displayed so as to be superimposed on the game space GS on the display 26.

The boss-character life meter 30 displays the life points HP of the boss character BC in the form of a meter. The life points HP of the boss character BC are decreased with attacks by the ally characters. In the battle game, the player wins when the life points HP of the boss character BC become 0.

Furthermore, the player-character life meter 32 displays the life points HP of the player character PC in the form of a meter. The life points HP of the player character PC are decreased with attacks by the enemy characters. Note that the life points HP of the ally characters, other than the player character PC, which have been organized into the party, may be displayed on the display 26. In the battle game, the player is defeated when the life points HP of the player character PC or all the life points HP of the ally characters become 0.

Furthermore, during the battle game, an angle operation section 22a, a movement operation section 22b, a normal-attack operation section 22c, and a special-attack operation section 22d are provided as the input unit 22 of the player terminal 1. That is, the input unit 22 of this embodiment is configured of a touchscreen, and the angle operation section 22a, the movement operation section 22b, the normal-attack operation section 22c, and the special-attack operation section 22d are provided at different positions on the touchscreen during the battle game.

The angle operation section 22a is provided in the upper right region of the display 26 disposed in the landscape orientation. The angle operation section 22a accepts an operation for changing the angle of the game space GS displayed on the display 26. For example, when a slide operation is performed so as to slide the player's finger in the horizontal direction in the angle operation section 22a, the angle of the game space GS displayed on the display 26 is changed in accordance with the direction of the operation.

The movement operation section 22b is provided substantially over the entire width of the display 26 disposed in the landscape orientation, as indicated by the one-dot chain line in FIG. 3B. The movement operation section 22b accepts an operation for performing an action of moving the player character PC (hereinafter, referred to as "movement operation"); for example, the movement operation section 22b detects a slide operation (swipe) with the player's finger as a movement operation. When a movement operation is input to the movement operation section 22b, the player character PC is moved in the direction of the movement operation.

The normal-attack operation section 22c is provided in the right half of the display 26 disposed in the landscape orientation, as indicated by the double-dot chain line in FIG. 3B. Note that the normal-attack operation section 22c is provided inside the movement operation section 22b here. That is, the movement operation section 22b and the normal-attack operation section 22c partially overlap each other. However, the movement operation section 22b and the normal-attack operation section 22c may be disposed at entirely different positions. For example, the movement operation section 22b may be provided in the left half of the display 26.

Here, in this embodiment, normal attack actions and special attack actions are provided as attack actions of the player character PC for attacking an enemy character. A normal attack action is an action for attacking an enemy character with a weapon that the player character PC is equipped with. Meanwhile, a special attack action is an action for attacking an enemy character with a skill (special ability) preset in the player character PC. It is possible to give greater damage points to an enemy character with the special attack action than with the normal attack action.

The normal-attack operation section 22c accepts an operation for causing the player character PC to perform a normal attack action (hereinafter, referred to as "normal attack operation"); for example, the normal-attack operation section 22c detects the player's finger being brought into contact or proximity (tap) as a normal attack operation. When a normal attack operation is input to the normal-attack operation section 22c, the player character PC performs a normal attack action on an enemy character.

The special-attack operation section 22d is provided in the lower right region of the display 26 disposed in the landscape orientation. The special-attack operation section 22d accepts an operation for causing the player character PC to perform a special attack action (hereinafter, referred to as "special attack operation"); for example, the special-attack operation section 22d detects the player's finger being brought into contact or proximity (tap) as a special attack operation.

When a special attack operation is input to the special-attack operation section 22d, the player character PC performs a special attack action on an enemy character. Note that special attack operations are effective only in the case where a preset condition is satisfied; for example, special attack operations are enabled only at predetermined intervals. In the following, normal attack actions and special attack actions will be collectively referred to as attack actions. Furthermore, normal attack operations and special attack operations will be collectively referred to as attack operations.

An attack action by the player character PC is performed on one of the enemy characters disposed in the game space GS as a target. That is, in the case where a plurality of enemy characters are present in the game space GS, one of the enemy characters is set as a target. When an attack operation is input, an attack action is performed on the enemy character set as the target.

As indicated by the cross-hatching in FIG. 3B, a target area TA is set for the player character PC. An enemy character included in the target area TA is set as a target. Note that, if no enemy character is included in the target area TA, the target is not set.

As described above, the enemy characters are made to perform movement actions through computer control. For example, when the player character PC enters a region set in advance, movement control is performed on an enemy character so as to approach the player character PC. At this time, since a two-dimensional image acquired by the virtual camera is displayed on the display 26 of the player terminal 1, the enemy character may not be included in the two-dimensional image depending on the position of the virtual camera. In such a case, the player cannot notice that the enemy character is approaching.

Thus, in the information processing system IS according to this embodiment, a correction range and a blend correction range are set for an enemy character. Then, at the player terminal 1, in the case where the player character PC enters the correction range or the blend correction range set for an enemy character, correction processing for changing hue (saturation) is executed with respect to an image acquired and generated by the virtual camera. Note that example cases in which the player character PC enters the correction range or the blend correction range set for an enemy character include: a case in which the player character PC moves in response to a player operation, thereby entering the correction range or the blend correction range; and a case in which the enemy character moves under computer control, whereby the player character PC enters the correction range or the blend correction range.

The correction range and the blend correction range will be described below, and then, the correction processing will be described below.

Figure 4A:
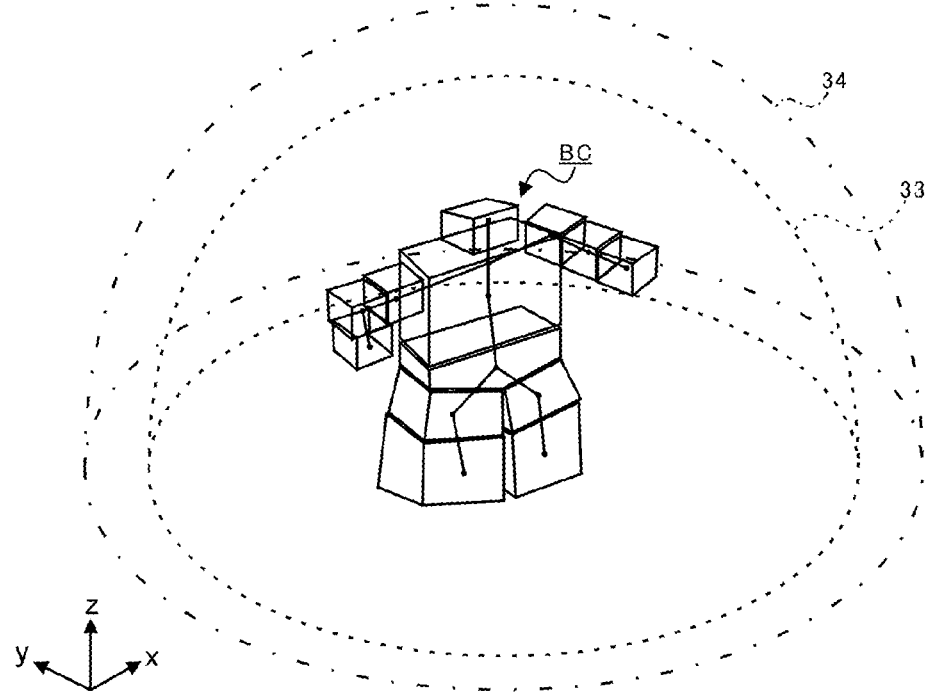
FIG. 4A is a view for explaining a correction range and a blend correction range.
Figure 4B:
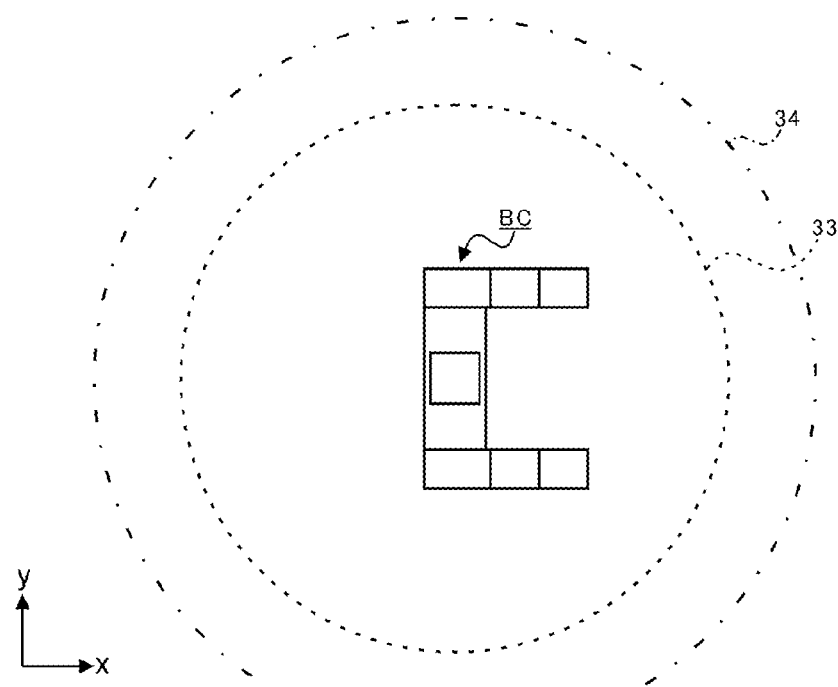
FIG. 4B is a view of the correction range and the blend correction range viewed in the z-axis direction.

FIG. 4A is an illustration for explaining a correction range 33 and a blend correction range 34. FIG. 4B is a view of the correction range 33 and the blend correction range 34 viewed in the z-axis direction. FIGS. 4A and 4B show the correction range 33 and the blend correction range 34 set for the boss character BC. Note that the correction range 33 and the blend correction range 34 may be set for all enemy characters or may be set for only one of the enemy characters (for example, the boss character BC).

As shown in FIGS. 4A and 4B, the hemispherical correction range 33 and the blend correction range 34 are set for the boss character BC. The correction range 33 is set, with the boss character BC serving as a reference, to a hemispherical range having a predetermined radius centered on the reference. The blend correction range 34 is set to a range located outside the correction range 33 and extending from the correction range 33 to a hemispherical outer circumference having a larger radius than the correction range 33, centered on the same reference position as that of the correction range 33.

Because the correction range 33 and the blend correction range 34 are set for the boss character BC in this way, when the boss character BC moves, the correction range 33 and the blend correction range 34 move in accordance with the movement of the boss character BC.

Note that the position serving as the reference (three-dimensional position) may be, for example, the position of the center of gravity of the boss character BC, may be a position that is located vertically downward (negative direction in the z-axis direction) of the position of the center of gravity of the boss character BC and that is on the ground in the z-axis direction, or may be another position. Furthermore, the correction range 33 may be formed in a spherical shape, a rectangular parallelepiped shape, or another shape.

Furthermore, as parameters for correcting an image acquired and generated by the virtual camera, a hue parameter and a priority are set for each of the correction range 33 and the blend correction range 34. In the hue parameter, saturation (S) in the HSV color space is defined. Furthermore, the priority is set at any of a plurality of steps.

Figure 5A:
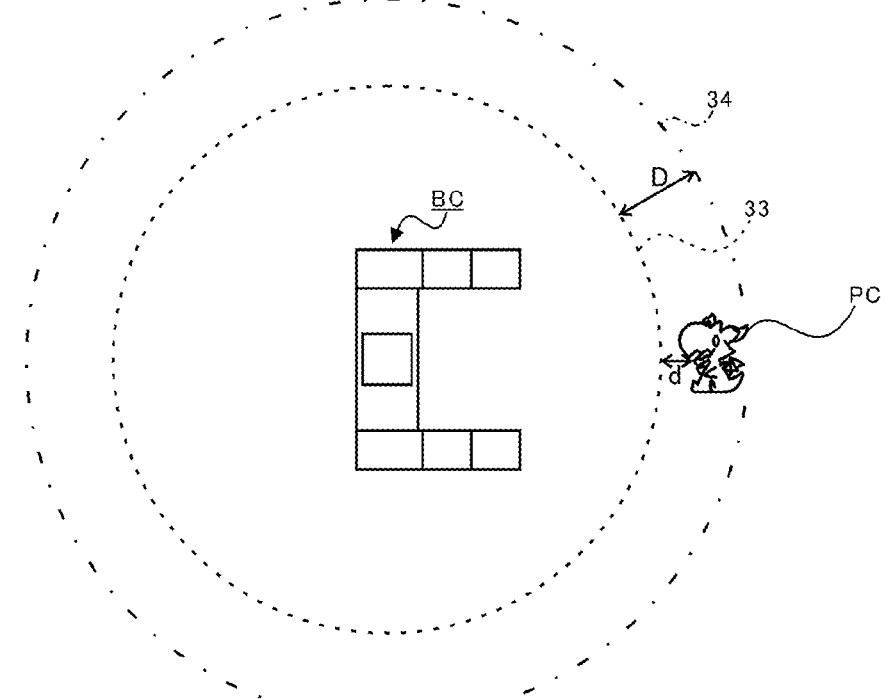
FIG. 5A is a view for explaining correction processing executed in the case where a player character PC enters the blend correction range.
Figure 5B:
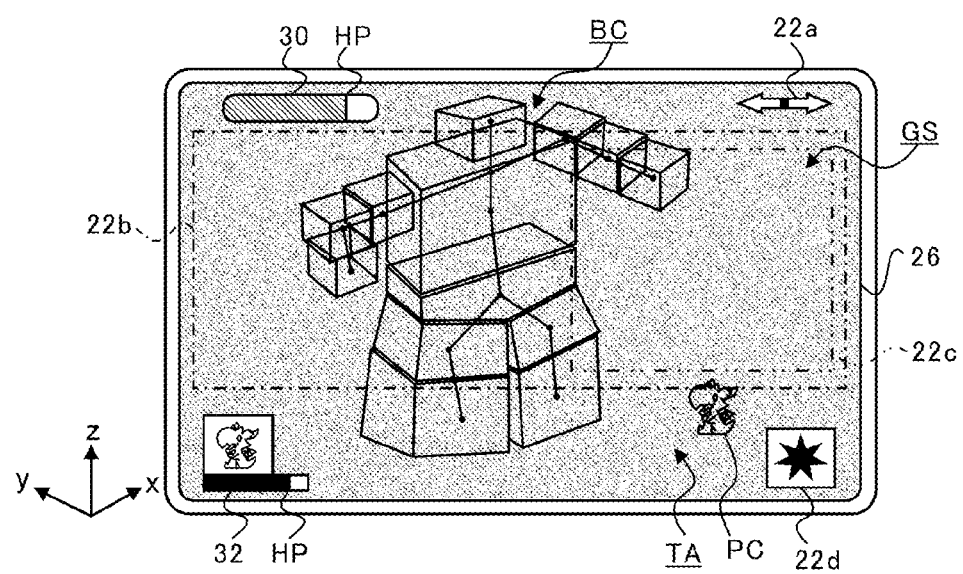
FIG. 5B is a view showing an image obtained after the correction processing has been executed.
Figure 6A:
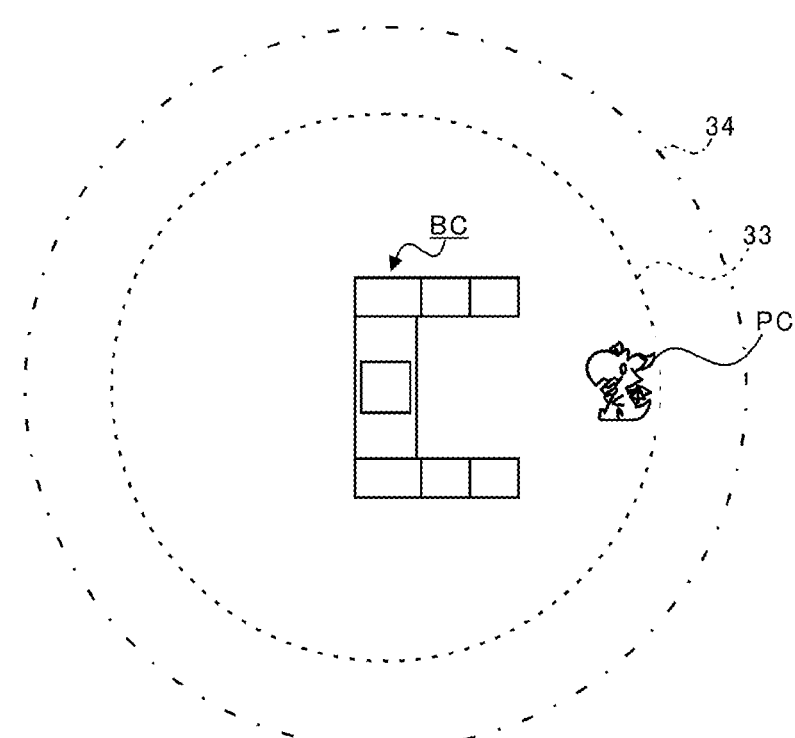
FIG. 6A is a view for explaining correction processing executed in the case where the player character PC enters the correction range.
Figure 6B:
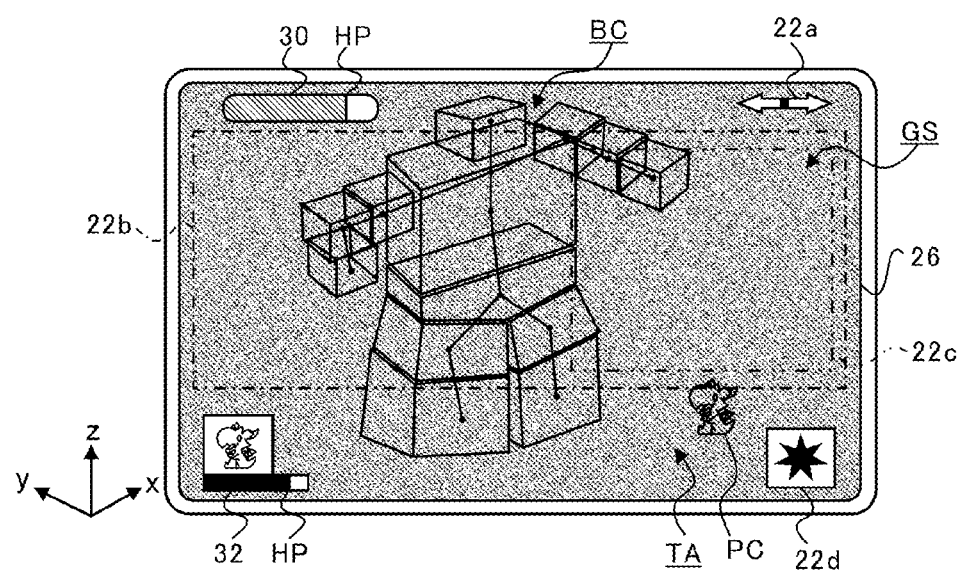
FIG. 6B is a view showing an image obtained after the correction processing has been executed.

FIG. 5A is a view for explaining correction processing executed in the case where the player character PC enters the blend correction range 34. FIG. 5B is a view showing an image obtained after the correction processing has been executed. FIG. 6A is a view for explaining correction processing executed in the case where the player character PC enters the correction range 33. FIG. 6B is a view showing an image obtained after the correction processing has been executed.

As shown in FIGS. 5A and 6A, in the case where the player character PC enters the correction range 33 or the blend correction range 34, which are set for the boss character BC, the player terminal 1 executes correction processing.

Here, an image generated by capturing the game space GS with the virtual camera is expressed in the RGB color space. Thus, when executing correction processing, the player terminal 1 converts the image expressed in the RGB color space into an image expressed in the HSV color space.

Then, the player terminal 1 derives the minimum distance (shortest distance) d in the radial direction from the correction range 33 to the player character PC. Furthermore, the player terminal 1 derives, as the maximum distance D, the shortest distance from the correction range 33 to the outer circumference of the blend correction range 34, that is, the difference in the radius between the correction range 33 and the blend correction range 34. Here, in the case where the player character PC enters the correction range 33, the minimum distance d is derived as 0.

Then, the player terminal 1 derives a blend parameter b by using the following Expression (1):

$$b=1-[(d/2)^2/(D/2)^2] \quad (1)$$

Here, because the range that the minimum distance d can take is from 0 to D, the range that the blend parameter b can take is from 0 to 1. Furthermore, the player terminal 1 sets the blend parameter b to 1 when the blend parameter b is greater than 1 and sets the blend parameter b to 0 when the blend parameter b is less than 0.

Thus, when the player character PC is located inside the correction range 33, the blend parameter b becomes 1. On the other hand, when the player character PC is located inside the blend correction range 34, the value of the blend parameter b increases as the player character PC approaches the correction range 33. Then, when the player character PC is located outside the blend correction range 34, the blend parameter b becomes 0.

After deriving the blend parameter b, the player terminal 1 derives saturation S used in the correction processing, by using the following Expression (2):

$$S=S_{BASE}+(S_A-S_{BASE})\times b \quad (2)$$

where $S_{BASE}$ denotes the saturation (base saturation) for a range outside the correction range 33 and the blend correction range 34, and $S_A$ denotes a hue parameter for the correction range 33.

According to Expression (2), when the player character PC is located inside the correction range 33, the saturation S becomes $S_A$ (hue parameter for the correction range 33). On the other hand, when the player character PC is located inside the blend correction range 34, the saturation S approaches $S_A$ as the player character PC approaches the correction range 33. Then, when the player character PC is located outside the blend correction range 34, the saturation S becomes $S_{BASE}$.

In this way, after deriving the saturation S used in the correction processing by using Expression (1) and Expression (2), the player terminal 1 converts the saturation S at each pixel of the image expressed in the HSV color space into the saturation S derived by using Expression (2). After that, the player terminal 1 reconverts the image obtained after the correction processing into an image expressed in the RGB color space, which can be displayed on the display 26, and displays the image obtained after the reconversion on the display 26.

Here, the hue parameter set for the correction range 33 is set, for example, to a value lower than $S_{BASE}$, which is set for the range other than the correction range 33 and the blend correction range 34. Therefore, images obtained after the correction processing become dark in their entirety, as shown in FIGS. 5B and 6B.

In this way, in the case where the player character PC enters the correction range 33, which is set for the enemy character, the correction processing for changing the hue is executed with respect to an image acquired and generated by the virtual camera. Accordingly, even when the enemy character moves through computer control, because the correction range 33 also moves in accordance with the movement of the enemy character, it is possible to allow the player to notice approach between the player character PC and the enemy character. This is advantageous particularly in the case where the player terminal 1 is a smartphone, in which the displayed screen is limited.

Note that, in the case where the player character PC enters the correction range 33, which is set for the enemy character, the saturation is converted into the saturation corresponding to the hue parameter set for the correction range 33 irrespective of the position of the player character PC. Therefore, while the player character PC is moving inside the correction range 33, the same correction processing is executed, whereby the saturation S is not changed. Thus, it is possible to prevent a situation in which the hue of the image is changed during a battle against the boss character BC, thus making it difficult to concentrate on the play.

Furthermore, in the case where the player character PC enters the blend correction range 34, the saturation S is determined in accordance with the distance (minimum distance d) between the correction range 33 and the player character PC, whereby the entire image becomes dark as the player character PC approaches the correction range 33.

Accordingly, it is possible to allow the player to notice the process in which the player character PC approaches the boss character BC.

Figure 7A:
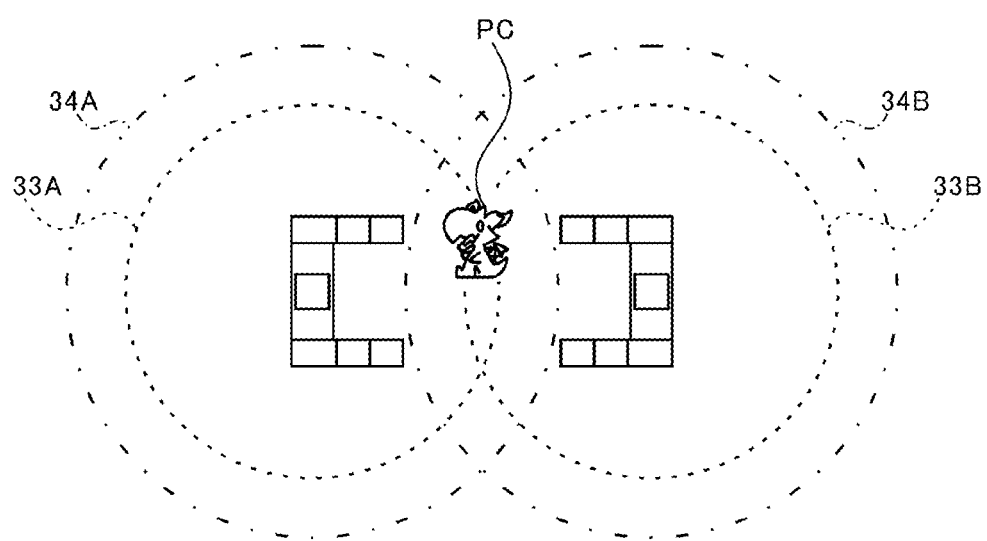
FIG. 7A is a view for explaining correction processing executed in the case where the player character PC enters an area where a plurality of correction ranges or blend correction ranges based on a plurality of enemy characters overlap.
Figure 7B:
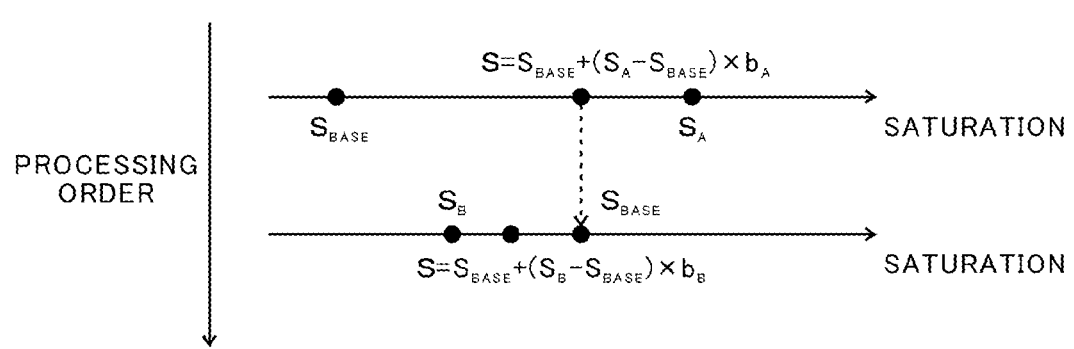
FIG. 7B is a view showing the process of the correction processing.

FIG. 7A is a view for explaining correction processing executed in the case where the player character PC enters an area where a plurality of correction ranges 33 or blend correction ranges 34 overlap. FIG. 7B is a view showing the process of the correction processing.

As shown in FIG. 7A, in the case where the player character PC enters an area where a plurality of (here, two) correction ranges 33 or blend correction ranges 34 based on a plurality of enemy characters overlap, the player terminal 1 executes the correction processing on the basis of the priorities of the correction ranges 33 or the blend correction ranges 34 that the player character PC has entered. Note that, in FIG. 7A, it is assumed that the correction range 33 that has a low priority is set as a correction range 33A, the blend correction range 34 that has a low priority is set as a blend correction range 34A, the correction range 33 that has a high priority is set as a correction range 33B, and the blend correction range 34 that has a high priority is set as a blend correction range 34B. Furthermore, it is assumed that the hue parameter set for the correction range 33A and the blend correction range 34A is $S_A$, and the hue parameter set for the correction range 33B and the blend correction range 34B is $S_B$.

The player terminal 1 first executes the above-described correction processing for the correction range 33A or the blend correction range 34B, which has a low priority, and then executes the above-described correction processing for the correction range 33B or the blend correction range 34B, which has a high priority.

Specifically, the player terminal 1 converts an image expressed in the RGB color space, the image being generated by capturing the game space with the virtual camera, into an image expressed in the HSV color space. After that, as shown in FIG. 7B, the player terminal 1 derives a blend parameter $b_A$ and the saturation S for the correction range 33A or the blend correction range 34A, which has a low priority, by using Expression (1) and Expression (2).

After that, the player terminal 1 derives a blend parameter $b_B$ and the saturation S for the correction range 33B or the blend correction range 34B, which has a high priority, by using Expression (1) and Expression (2), as shown in FIG. 7B. At this time, the saturation S is derived by substituting the saturation S derived for the correction range 33A or the blend correction range 34A, which has a low priority, for $S_{BASE}$ and by substituting $S_B$ for $S_A$ in Expression (2).

After that, the player terminal 1 converts the saturation S at each pixel in the image expressed in the HSV color space into the saturation S derived for the correction range 33B or the blend correction range 34B, which has a high priority. Then, the player terminal 1 reconverts the image in which the saturation S has been converted, into an image expressed in the RGB color space, which can be displayed on the display 26, and displays the image obtained after the reconversion on the display 26.

In this way, when the player character PC enters an area where a plurality of correction ranges 33 or blend correction ranges 34 overlap, the correction processing is executed first for the correction range 33 or the blend correction range 34, which has a low priority. Accordingly, it is possible to allow the player to notice that a plurality of enemy characters are approaching the player character PC.

Next, a functional configuration and processing for executing the above-described battle game will be described below. Note that descriptions of the basic configuration and processing for proceeding with the game as well as configuration and processing that are irrelevant to the battle game will be omitted here. Furthermore, a solo-play, in which a player plays the game alone, will be described below, and a description of a multi-play, in which the game is played by a plurality of players, will be omitted.

Figure 8:
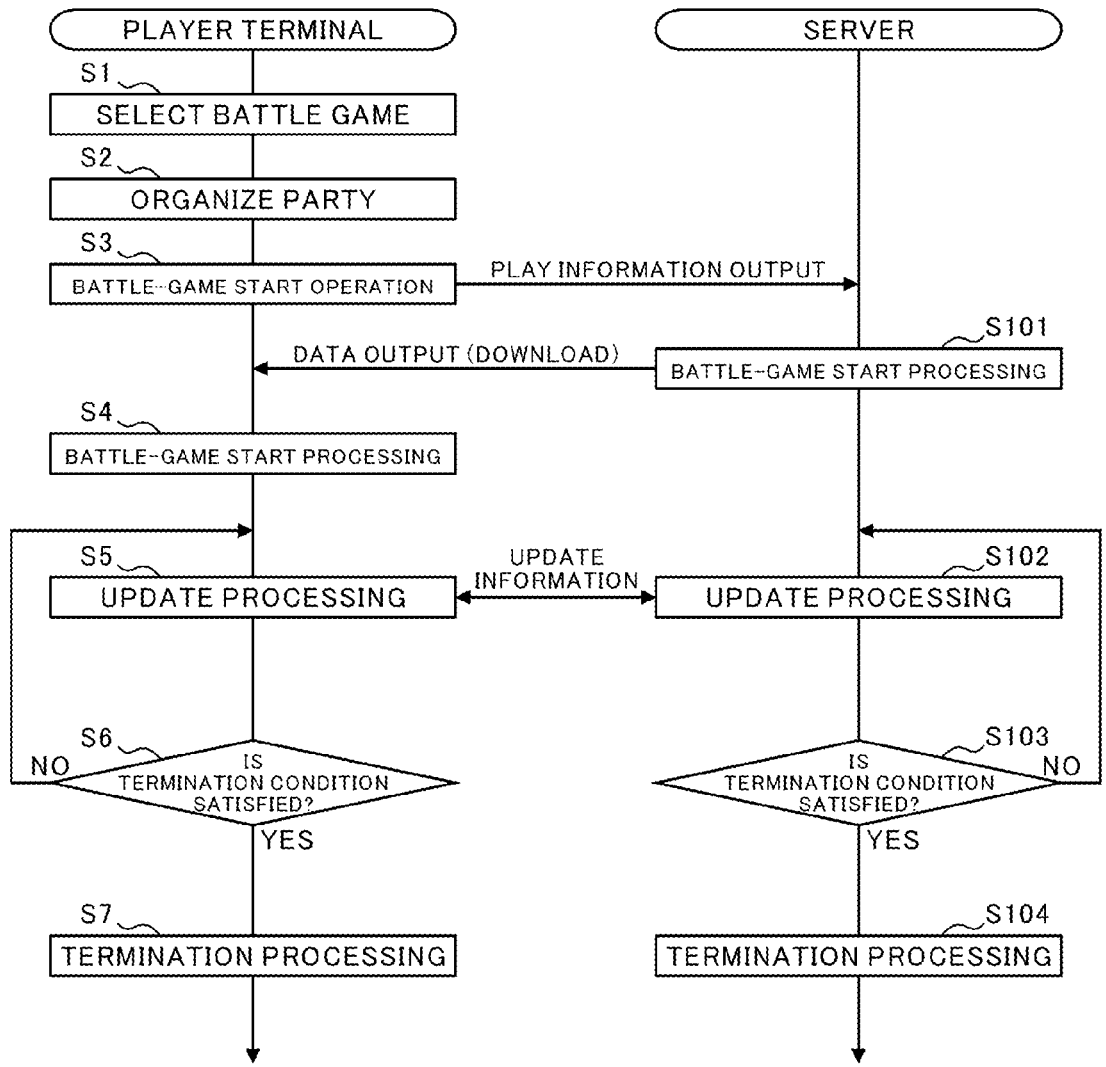
FIG. 8 is a view for explaining the flow of processing at the player terminal and the server during execution of a battle game.

FIG. 8 is a view for explaining the flow of processing at the player terminal 1 and the server 100 during execution of a battle game. When a game application is activated on the player terminal 1, a menu screen is displayed on the display 26. The player can select one from among a plurality of battle games on the menu screen (S1). When a battle game has been selected, a party organizing screen is displayed, which enables various kinds of settings for ally characters (S2). After the organization of a party is finished, when the player performs a battle start operation, play information is output to the server 100 (S3).

Here, as the play information, for example, various kinds of information needed in the battle game, such as the kind of the battle game selected by the player, the ally characters organized into the party, the player character PC, and items of equipment, are output.

At the server 100, in response to the input of the play information, battle-game start processing needed for starting the battle game is executed (S101). Here, for example, an area of the memory 112 for proceeding with the battle game is allocated, the play information input from the player terminal 1 is stored, and a predetermined program is loaded from the storage unit 118 into the memory 112. Furthermore, the server 100 outputs predetermined data to the player terminal 1 and allows the player terminal 1 to download data.

Then, at the player terminal 1, battle-game start processing needed for starting the battle game is also executed (S4). Here, for example, an area of the memory 12 for proceeding with the battle game is allocated, the play information is stored, and the program and image data downloaded from the server 100 are stored in the memory 12. Note that the program etc. needed for the battle game may be loaded from the storage unit 18 into the memory 12.

When the preparations for the battle game are finished, as described above, terminal-side battle-game control processing at the player terminal 1 and server-side battle-game control processing at the server 100 are executed concurrently. In the terminal-side battle-game control processing and the server-side battle-game control processing, update processing for updating various kinds of information is executed (S5 and S102). The update processing is repeatedly executed on a per-frame basis until a condition for terminating the battle game is satisfied (No in S6 and S103).

Note that the number of frames is not particularly limited; for example, the number of frames per second is 30 to 60. Therefore, during the battle game, information is updated at intervals of about 16 milliseconds (ms) to 33 ms at the player terminal 1 and the server 100. Furthermore, in the update processing, update information is sent and received between the player terminal 1 and the server 100. Then, when the condition for terminating the battle game is satisfied (YES in S6 and S103), termination processing for terminating the terminal-side battle-game control processing and the server-side battle-game control processing is executed (S7 and S104). Note that, although the update processing is executed and update information is sent and received on a per-frame basis here, the update processing may be executed and the update information may be sent and received at intervals shorter or longer than a per-frame basis.

Figure 9:
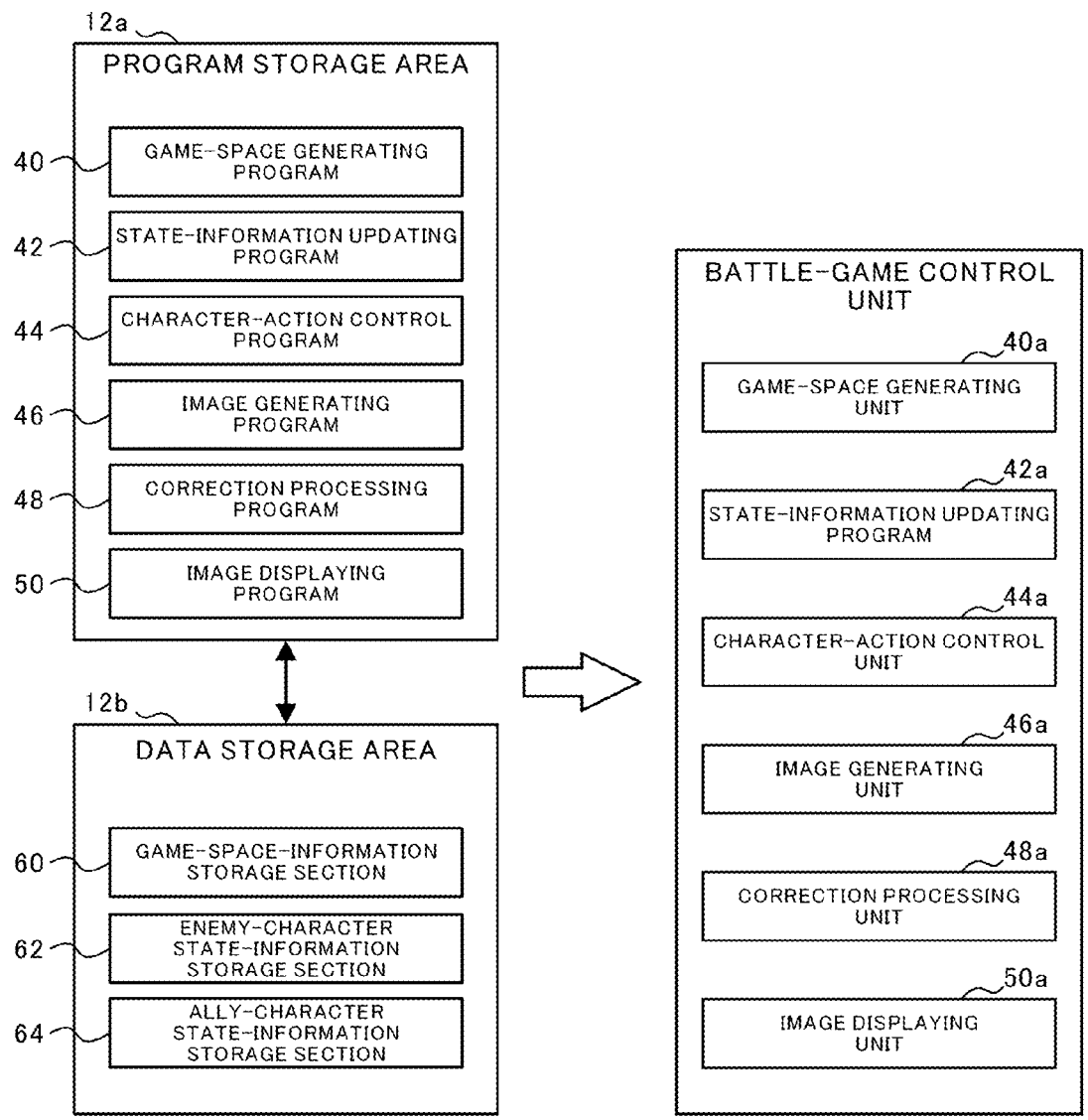
FIG. 9 is a diagram for explaining the configuration of a memory and the function of a computer at the player terminal.

FIG. 9 is a diagram for explaining the configuration of the memory 12 and the function of a computer at the player terminal 1. In the memory 12, a program storage area 12a and a data storage area 12b are provided. When a battle game is started, the CPU 10 stores programs (modules) for the terminal-side battle-game control processing in the program storage area 12a.

The programs for the terminal-side battle-game control processing include a game-space generating program 40, a state-information updating program 42, a character-action control program 44, an image generating program 46, a correction processing program 48, and an image displaying program 50. Note that the programs listed in FIG. 9 are merely examples, and a large number of other programs are also provided in the programs for the terminal-side battle-game control processing.

In the data storage area 12b, a game-space-information storage section 60, an enemy-character state-information storage section 62, and an ally-character state-information storage section 64 are provided as storage sections for storing data. Note that the above-mentioned storage sections are merely examples, and a large number of other storage sections are also provided in the data storage area 12b.

The CPU 10 runs the individual programs stored in the program storage area 12a and updates data in the individual storage sections of the data storage area 12b. Then, the CPU 10 runs the individual programs stored in the program storage area 12a, thereby causing the player terminal (computer) to function as a battle-game control unit.

Specifically, the CPU 10 runs the game-space generating program 40, thereby causing the computer to function as a game-space generating unit 40a. Similarly, the CPU 10 runs the state-information updating program 42, the character-action control program 44, the image generating program 46, the correction processing program 48, and the image displaying program 50, thereby causing the computer to function as a state-information updating unit 42a, a character-action control unit 44a, an image generating unit 46a, a correction processing unit 48a, and an image displaying unit 50a, respectively.

The game-space generating unit 40a generates a game space GS on the basis of game-space information stored in the game-space-information storage section 60.

The state-information updating unit 42a updates state information indicating the states of enemy characters and ally characters.

The state-information updating unit 42a updates the state information in the enemy-character state-information storage section 62 on the basis of update information output from the server 100. The state information of the enemy character includes the positions in the x-, y-, and z-axis directions, the posture (tilt), the orientation, an action, the correction range 33, the blend correction range 34, the hue parameter, and the priority of the enemy character.

Furthermore, the state-information updating unit 42a updates the state information in the ally-character state-information storage section 64. The state information of the ally characters includes the positions in the x-, y-, and z-axis directions, the posture (tilt), the orientation, an action, and equipped-weapon information of each of the ally characters organized into the party. The state-information updating unit 42a updates the state information of the player character PC mainly on the basis of movement operations and attack operations input from the input unit 22. Furthermore, state information of the ally characters other than the player character PC is updated according to auto-control of those ally characters.

The character-action control unit 44a causes the enemy characters and the ally characters to act in the game space GS on the basis of the state information. That is, the character-action control unit 44a moves the ally characters in the game space GS in response to player operations.

The image generating unit 46a generates an image expressed in the RGB color space, acquired by capturing the game space GS with the virtual camera.

The correction processing unit 48a converts the image generated by the image generating unit 46a into an image expressed in the HSV color space and then executes the above-described correction processing. Furthermore, the correction processing unit 48a reconverts the image on which the correction processing has been executed, into an image expressed in the RGB color space.

The image displaying unit 50a displays, on the display 26, the image expressed in the RGB color space, which is obtained after the reconversion.

Next, the terminal-side battle-game control processing will be described below. Note that processing related to images will be mainly described below.

Figure 10:
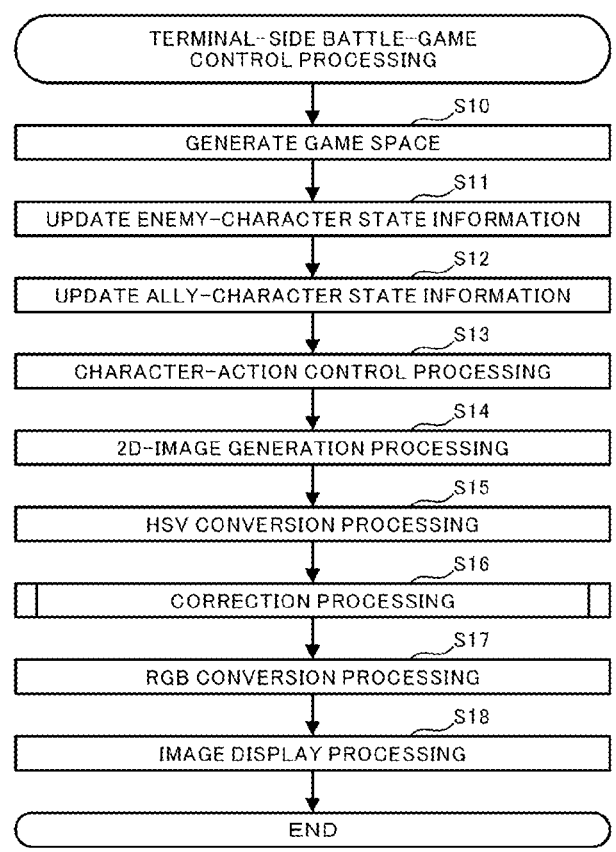
FIG. 10 is a flowchart showing an example of terminal-side battle-game control processing.

FIG. 10 is a flowchart showing an example of the terminal-side battle-game control processing. As described above, the terminal-side battle-game control processing at the player terminal 1 and the server-side battle-game control processing at the server 100 are executed concurrently. Furthermore, the terminal-side battle-game control processing and the server-side battle-game control processing are executed on a per-frame basis, and update information is sent and received every frame.

In the terminal-side battle-game control processing, the game-space generating unit 40a generates a game space GS (S10). The state-information updating unit 42a updates the state information in the enemy-character state-information storage section 62 on the basis of update information input from the server 100 (S11). Furthermore, the state-information updating unit 42a updates the state information in the ally-character state-information storage section 64 on the basis of update information input from the server 100 (S12).

The character-action control unit 44a causes the enemy character to act on the basis of the state information in the enemy-character state-information storage section 62 and causes the ally character to act on the basis of the state information in the ally-character state-information storage section 64 (S13).

The image generating unit 46a generates an image expressed in the RGB color space, acquired by capturing the game space GS with the virtual camera (S14). The correction processing unit 48a converts the image generated by the image generating unit 46a into an image expressed in the HSV color space (S15) and then executes the correction processing shown in FIG. 11 (S16).

Figure 11:
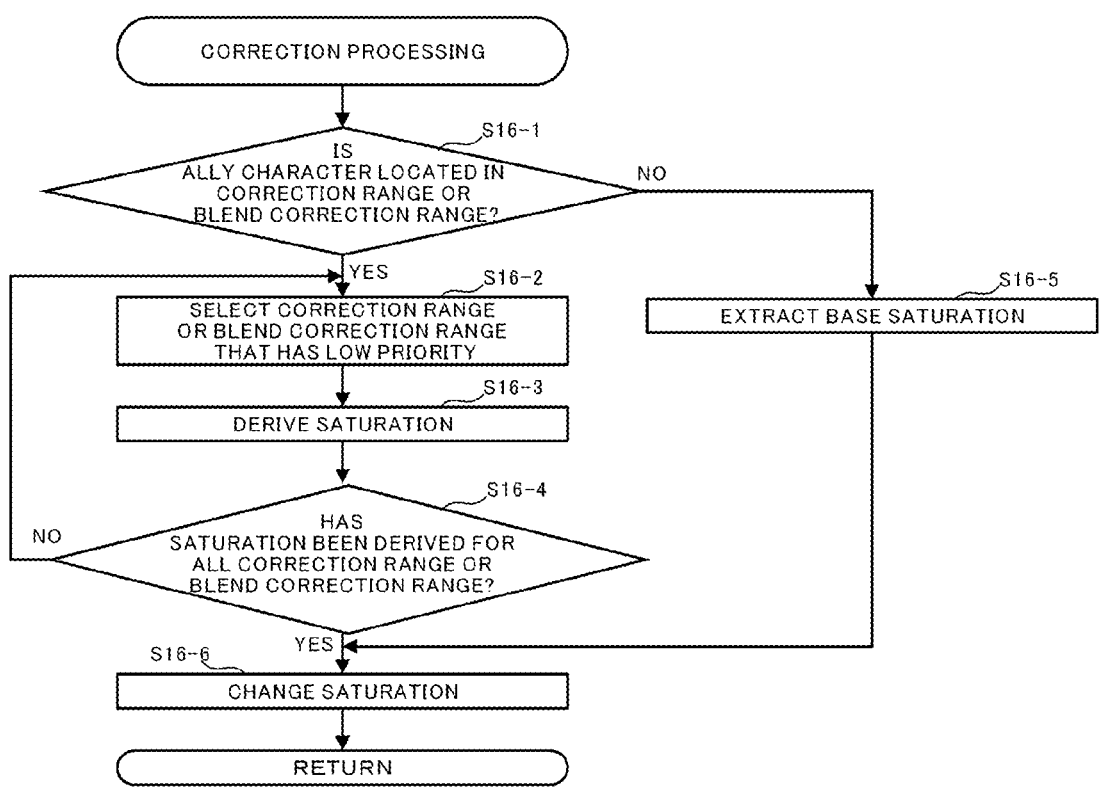
FIG. 11 is a flowchart showing an example of the correction processing.

FIG. 11 is a flowchart showing the correction processing. The correction processing unit 48a determines whether the player character PC has entered the correction range 33 or the blend correction range 34 (S16-1). If the player character PC has entered the correction range 33 or the blend correction range 34 (YES in S16-1), the correction processing unit 48a selects, from the correction range 33 or the blend correction range 34 that the player character PC has entered, the correction range 33 or the blend correction range 34 that has not yet been selected and that has the lowest priority (S16-2).

Then, the correction processing unit 48a derives the saturation S by using the above-described Expression (1) and Expression (2) (S16-3). After that, the correction processing unit 48a determines whether the saturation S has been derived for all the correction range 33 or the blend correction range 34 that the player character PC has entered (S16-4). Then, if it is determined that the saturation S has not been derived for all the correction range 33 or the blend correction range 34 that the player character PC has entered (No in S16-4), the correction processing unit 48a returns the processing to Step S16-2.

On the other hand, if it is determined that the player character PC has not entered the correction range 33 or the blend correction range 34 (No in S16-1), the correction processing unit 48a extracts the base saturation (S16-5).

After that, the correction processing unit 48a converts the saturation S at each pixel of the image expressed in the HSV color space into the saturation S derived in Step S16-3 or extracted in Step S16-6.

Returning to FIG. 10, the correction processing unit 48a reconverts the image on which the correction processing has been executed, into an image expressed in the RGB color space, which can be displayed on the display 26 (S17), and displays the image obtained after the reconversion on the display 26 (S18).

Figure 12:
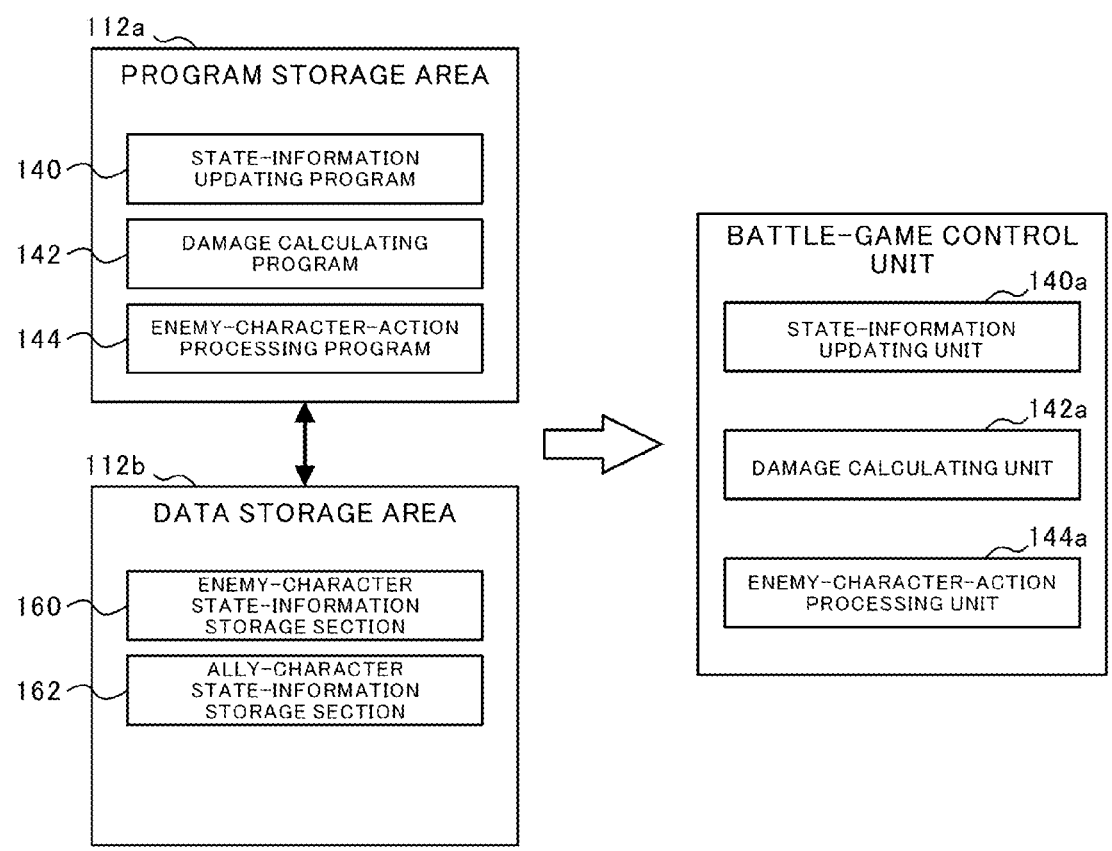
FIG. 12 is a diagram for explaining the configuration of a memory and the function of a computer at the server.

FIG. 12 is a diagram for explaining the configuration of the memory 112 and the function of a computer at the server 100. In the memory 112, a program storage area 112a and a data storage area 112b are provided. When a battle game is started, the CPU 110 stores programs (modules) for the server-side battle-game control processing in the program storage area 112a.

The programs for the server-side battle-game control processing include a state-information updating program 140, a damage calculating program 142, and an enemy-character-action processing program 144. Note that the programs listed in FIG. 12 are merely examples, and a large number of other programs are also provided in the programs for the server-side battle-game control processing.

In the data storage area 112b, an enemy-character state-information storage section 160 and an ally-character state-information storage section 162 are provided as storage sections for storing data. Note that the above-mentioned storage sections are merely examples, and a large number of other storage sections are also provided in the data storage area 112b.

The CPU 110 runs the individual programs stored in the program storage area 112a and updates data in the individual storage sections of the data storage area 112b. Then, the CPU 110 runs the individual programs stored in the program storage area 112a, thereby causing the server 100 (computer) to function as a battle-game control unit.

Specifically, the CPU 110 runs the state-information updating program 140, thereby causing the computer to function as a state-information updating unit 140a. Similarly, the CPU 110 runs the damage calculating program 142 and the enemy-character-action processing program 144, thereby causing the computer to function as a damage calculating unit 142a and an enemy-character-action processing unit 144a, respectively.

The state-information updating unit 140a updates state information indicating the states of enemy characters and ally characters.

The state-information updating unit 140a updates the state information in the enemy-character state-information storage section 160 on the basis of processing of the enemy-character-action processing program 144. The state information of the boss character BC managed in the server 100 includes the positions in the x-, y-, and z-axis directions, the posture (tilt), the orientation, an action (the kind of the action etc.), the life points HP, the correction range 33, the blend correction range 34, the saturation, and the priority.

Furthermore, the state-information updating unit 140a updates the state information in the ally-character state-information storage section 162. The state information of the ally characters includes the positions in the x-, y-, and z-axis directions, the posture (tilt), an action, equipment information concerning a weapon, etc., the life points HP, the normal attacking power, and the special attacking power of each of the ally characters organized into the party. The state-information updating unit 140a updates the state information concerning the positions of the ally characters, such as positions, postures (tilts), and actions, on the basis of state information input from the player terminal 1.

Furthermore, the state-information updating unit 140a updates the life points HP in accordance with damage points calculated through the damage calculation processing. Note that, of the state information, the equipment, the normal attacking power, and the special attacking power are set by the state-information updating unit 140a on the basis of player information accumulated in the memory 112, when a battle game is started.

The enemy-character-action processing unit 144a controls movement actions and attack actions of the enemy character according to a predetermined algorithm.

Next, the server-side battle-game control processing will be described below.

Figure 13:
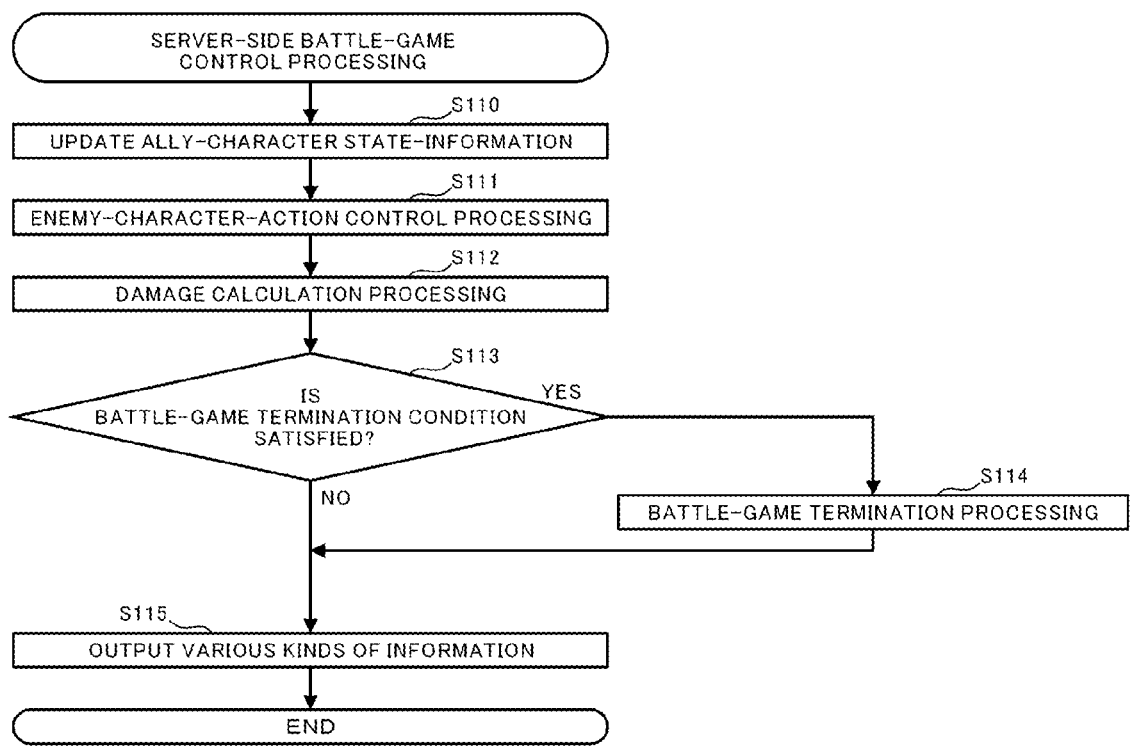
FIG. 13 is a flowchart showing an example of server-side battle-game control processing.

FIG. 13 is a flowchart showing an example of the server-side battle-game control processing. The state-information updating unit 140a updates the ally-character state-information storage section 162 on the basis of state information of the ally character input from the player terminal 1 (S110). Furthermore, the enemy-character-action processing unit 144a causes the enemy character to perform a movement action and an attack action according to the predetermined algorithm (S111). Then, when the ally character attacks the enemy character and when the enemy character attacks the ally character, the damage calculating unit 142a executes damage calculation processing (S112).

Then, when the life points HP of the player character PC become 0 or when the life points HP of the boss character BC, for example, become 0, it is determined that the condition for terminating the battle game is satisfied (YES in S113), and battle-game termination processing is executed (S114).

Furthermore, when the condition for terminating the battle game is not satisfied (NO in S113), update information containing the state information of the boss character BC and the player character PC is output to the player terminal 1 (S115), and the server-side battle-game control processing ends; and, when the battle-game termination processing has been executed, update information containing the state information of the boss character BC and the player character PC is output to the player terminal 1 (S115), and the server-side battle-game control processing ends.

The battle game is realized through the above-described terminal-side battle-game control processing at the player terminal 1 and the above-described server-side battle-game control processing at the server 100.

Note that, in the above-described embodiment, the saturation S for an image expressed in the HSV color space is corrected in the correction processing. However, the correction processing is not limited thereto. For example, it is also possible to correct the hue H or the value V for an image expressed in the HSV color space. Furthermore, it is also possible to correct R, G, and B of an image expressed in the RGB color space. In this case, it is not necessary to convert an image expressed in the RGB color space into an image expressed in the HSV color space.

Furthermore, in the above-described embodiment, the correction processing is executed with respect to an image acquired and generated (rendered) by the virtual camera. However, the correction processing may be executed during the process of acquisition and generation (process of rendering) in the virtual camera.

Furthermore, in the above-described embodiment, the correction range 33 and the blend correction range 34 are set for an enemy character (an other object). However, the other object is not limited only to an enemy character and may also be, for example, fire, water, etc., as long as movement thereof is controlled through computer control.

Furthermore, in the above-described embodiment, a description has been given of a case in which the player character PC performs actions in response to player operations. However, the player character PC may perform actions by means of auto-operations based on a program.

Furthermore, in the above-described embodiment, a description has been given of a case in which the program storage area, the battle-game control unit, and the data storage area are provided in each of the player terminal 1 and the server 100. However, the program storage area, the battle-game control unit, and the data storage area provided in each of the player terminal 1 and the server 100 may be provided only in the player terminal 1 or the server 100 or may be provided in a place different from those in the above-described embodiment.

Furthermore, in the above-described embodiment, the programs for realizing a battle game may be stored in a computer-readable storage medium. Furthermore, the above-described embodiment may be embodied as information processing methods for realizing the functions and the steps shown in the flowcharts.

Although an aspect of the embodiment has been described above with reference to the accompanying drawings, it goes without saying that the present invention is not limited to the embodiment described above. It would be obvious that a person skilled in the art could conceive of various modifications and amendments within the scope recited in the claims, and it will be understood that those modifications and amendments obviously belong to the technical scope of the present invention.

What is claimed is:

1. A non-transitory computer readable medium storing a program causing a computer to execute a method comprising:
   moving a first object in a virtual space in response to a player operation;
   controlling movement of a second object in the virtual space; and
   executing, in response to the first object entering a correction range set for the second object, correction processing with respect to an image,
   wherein the image is acquired and generated by a virtual camera disposed in the virtual space,
   wherein a blend correction range is set, for the second object, at an outer side of the correction range, and
   wherein the correction processing with respect to the image comprises:
      first correction processing that changes saturation of the image in response to the first object being positioned in the blend correction range; and
      second correction processing that changes the saturation of the image in response to the first object being positioned in the correction range.

2. The non-transitory computer readable medium according to claim 1,
   wherein a plurality of correction ranges and a plurality of priorities are set for a plurality of objects; and
   wherein the correction processing with respect to the image is executed based on a respective priority among the plurality of priorities priority in response to the first object entering an area where the plurality of correction ranges set for the plurality of objects overlap.

3. The non-transitory computer readable medium according to claim 1,
   wherein, when the own in response to the first object enters entering the blend correction range, the correction processing with respect to the image is executed in accordance with a distance between the correction range and the own first object.

4. The non-transitory computer readable medium according to claim 2,
   wherein, in response to the first object entering the blend correction range, the correction processing with respect to the image is executed in accordance with a distance between the correction range and the first object.

5. An information processing method comprising:
   moving a first object in a virtual space in response to a player operation;
   controlling movement of a second object in the virtual space; and
   executing, in response to the first object entering a correction range set for the second object, correction processing with respect to an image,
   wherein the image is acquired and generated by a virtual camera disposed in the virtual space,
   wherein a blend correction range is set, for the second object, at an outer side of the correction range, and
   wherein the correction processing with respect to the image comprises:
      first correction processing that changes saturation of the image in response to the first object being positioned in the blend correction range; and
      second correction processing that changes the saturation of the image in response to the first object being positioned in the correction range.

6. An information processing device comprising a computer configured to execute a method comprising:
   moving a first object in a virtual space in response to a player operation;
   controlling movement of a second object in the virtual space; and
   executing, in response to the first object entering a correction range set for the second object, correction processing with respect to an image,
   wherein the image is acquired and generated by a virtual camera disposed in the virtual space,
   wherein a blend correction range is set, for the second object, at an outer side of the correction range, and
   wherein the correction processing with respect to the image comprises:
      first correction processing that changes saturation of the image in response to the first object being positioned in the blend correction range; and
      second correction processing that changes the saturation of the image in response to the first object being positioned in the correction range.

7. A non-transitory computer readable medium storing a program causing a computer to execute a method comprising:

moving a first object in a virtual space in response to a player operation;
controlling movement of a second object in the virtual space; and
executing, in response to the first object entering a correction range set for the second object, correction processing with respect to an image,
wherein the image is acquired and generated by a virtual camera disposed in the virtual space,
wherein a blend correction range is set, for the second object, at an outer side of the correction range, and
wherein, in response to the first object entering the blend correction range, the correction processing with respect to the image is executed in accordance with a distance between the correction range and the first object.

8. An information processing method comprising:
moving a first object in a virtual space in response to a player operation;
controlling movement of a second object in the virtual space; and
executing, in response to the first object entering a correction range set for the second object, correction processing with respect to an image,
wherein the image is acquired and generated by a virtual camera disposed in the virtual space,
wherein a blend correction range is set, for the second object, at an outer side of the correction range, and
wherein, in response to the first object entering the blend correction range, the correction processing with respect to the image is executed in accordance with a distance between the correction range and the first object.

9. An information processing device comprising a computer configured to execute a method comprising:
moving a first object in a virtual space in response to a player operation;
controlling movement of a second object in the virtual space; and
executing, in response to the first object entering a correction range set for the second object, correction processing with respect to an image,
wherein the image is acquired and generated by a virtual camera disposed in the virtual space,
wherein a blend correction range is set, for the second object, at an outer side of the correction range; and
wherein, in response to the first object entering the blend correction range, the correction processing with respect to the image is executed in accordance with a distance between the correction range and the first object.

* * * * *